United States Patent [19]

Jacobsen et al.

[11] Patent Number: 5,684,448

[45] Date of Patent: Nov. 4, 1997

[54] SHAPE MEMORY ACTUATED SWITCHING DEVICE

[75] Inventors: Stephen C. Jacobsen; Clark C. Davis; Kent Backman, all of Salt Lake City, Utah

[73] Assignee: Sarcos, Inc., Salt Lake City, Utah

[21] Appl. No.: 434,462

[22] Filed: May 4, 1995

[51] Int. Cl.[6] .................................................. H01H 71/18
[52] U.S. Cl. .................................................. 337/140; 337/123
[58] Field of Search .................................. 337/2, 60, 65, 337/123, 139, 133, 140, 141; 60/527, 528; 246/219, 218, 229, 230, 233, 236

[56] References Cited

U.S. PATENT DOCUMENTS

| | | | |
|---|---|---|---|
| 3,725,835 | 4/1973 | Hopkins et al. | 337/140 |
| 4,544,988 | 10/1985 | Hochstein | 361/211 |
| 4,772,807 | 9/1988 | Bouvot | 337/141 X |
| 4,887,430 | 12/1989 | Kroll et al. | 337/140 X |
| 5,226,619 | 7/1993 | Alger | 337/140 X |

Primary Examiner—Leo P. Picard
Assistant Examiner—Jayprakash N. Gandhi
Attorney, Agent, or Firm—Thorpe, North & Western, L.L.P.

[57] ABSTRACT

A T-shaped member is pivotally mounted to a support plate, and has first and second shape memory wires attached at first ends thereof to opposing portions of the T-shape. Second opposing free ends of the shape memory wires are secured to the support plate. Electrical current is conducted alternately through the first and second shape memory wires to cause the wires to contract in alternating tandem, to thereby cause the T-shaped member to move between first and second positions. Pivotal movement of the T-shaped member can be used to actuate and/or reactivate a switch device.

12 Claims, 2 Drawing Sheets

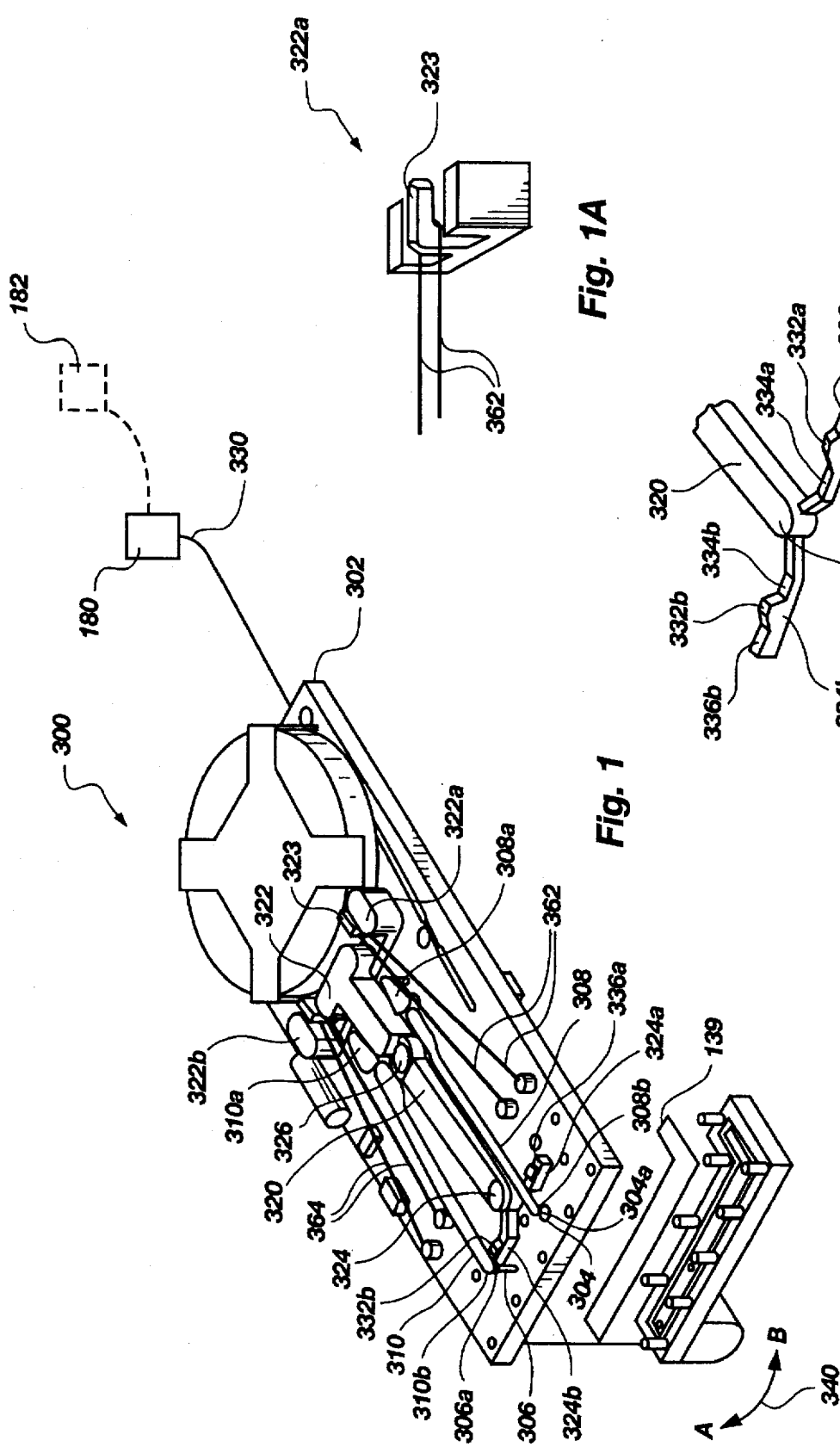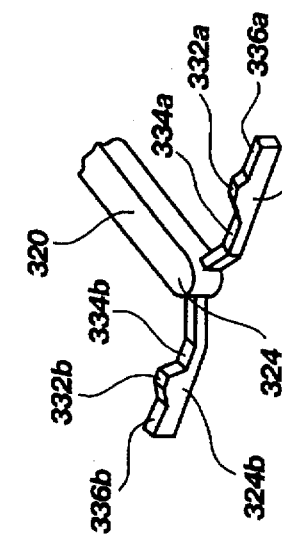

5,684,448

SHAPE MEMORY ACTUATED SWITCHING DEVICE

BACKGROUND OF THE INVENTION

1. The Field of the Invention

The present invention relates generally to switches, and more particularly to a pivoting switching device driven by shape memory wires.

2. The Background Art

Switching devices are well known in the art for moving a switch into a plurality of positions. Some switches are manually operable, while others are mechanically driven. Of current interest are mechanically driven switches utilizing shape memory alloys as a driving force.

OBJECTS AND SUMMARY OF THE INVENTION

It is therefore an object of the present invention to provide a shape memory actuated switching device capable of moving a switch into a plurality of positions.

It is an additional object of the invention to provide such a switching device which is efficient and reliable.

The above objects and others not specifically recited are realized in a specific illustrative embodiment of a shape memory actuated switching device. A T-shaped member is pivotally mounted to a support plate, and has first and second shape memory wires attached at first ends thereof to opposing portions of the T-shape. Second opposing free ends of the shape memory wires are secured to the support plate. Electrical current is conducted alternately through the first and second shape memory wires to cause the wires to contract in alternating tandem, to thereby cause the T-shaped member to move between first and second positions. Pivotal movement of the T-shaped member can be used to actuate and/or deactivate a switch device.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 1 is a perspective view of a switching device made in accordance with the principles of the present invention;

FIG. 1A shows an enlarged view of a first end portion of a shaft body of the switching device of FIG. 1;

FIG. 1B shows an enlarged, fragmented view of a second end of the shaft body of the switching device of FIG. 1.

DETAILED DESCRIPTION

Figure 2:
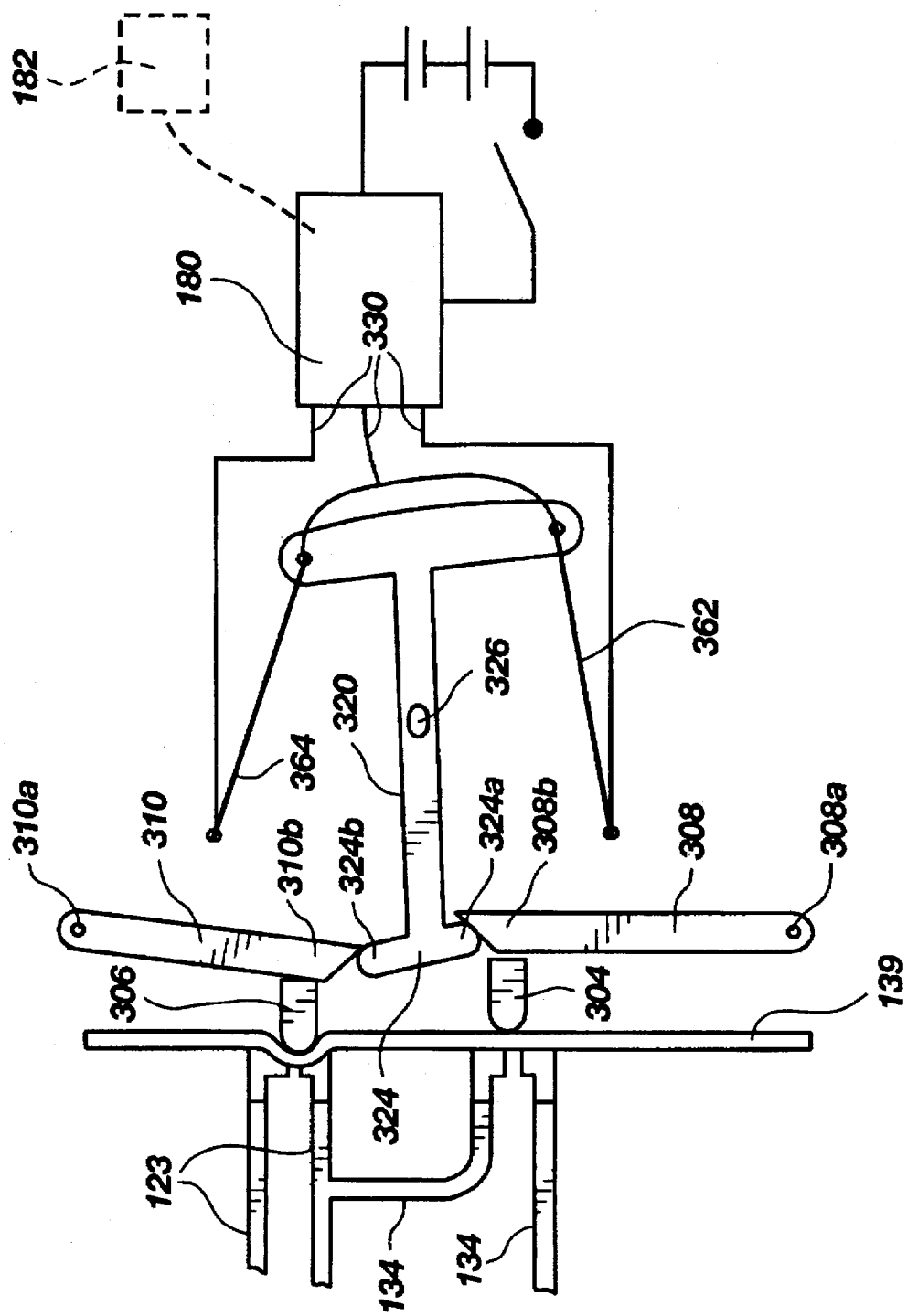
FIG. 2 is a schematic view of the switching device of FIG. 1 as applied to pinch valves.

Referring to FIGS. 1-2, a shape-memory wired switching device 300 is shown. First shape memory wire 362 and second shape memory wire 364 operate to drive the switching device 300, as explained below in more detail. Shape memory materials are malleable when their temperature is below the material's transition temperature. When heated above the transition temperature, the material forcefully returns to its original shape. One method of heating a wire is to pass electric current through it.

The switching device 300 includes a support plate 302. First and second valve pins 304 and 306 each include a proximal end 304a and 306a, and an opposing distal end (not shown). The first and second valve pins 304 and 306 are slidably disposed in the support plate 302 with their distal ends residing against flow channel apparatus such as a resilient membrane 139.

First and second levers 308 and 310 are respectively attached at first portions 308a and 310a thereof to the support plate 302. The levers 308 and 310 are respectively biased at second opposing portions 308b and 310b thereof against the proximal ends 304a and 306a of the first and second valve pins 304 and 306. The levers 308 and 310 thereby exert pressure upon the valve pins 304 and 306, respectively, to force said valve pins into contact with the resilient membrane 139.

A rigid shaft body 320 includes first and second opposing ends 322 and 324, and is pivotally mounted to the support plate 302 at a pivot point 326 thereof. The first opposing end 322 has first and second opposing sides 322a and 322b. The second opposing end 324 includes first and second rod members 324a and 324b extending laterally outward in opposing directions from the shaft body 320. Each rod member includes a narrower portion 334, a thicker portion 336, and a bump 332 separating the thicker and narrower portions. The bumps 332a–b extend outward from the shaft body 320 in a direction toward the levers 308 and 310, respectively, and further in this direction than the thicker portions 336a–b. The bumps 332a–b are thereby engageable with the levers 308 and 310, respectively, so as to produce resistance to pivotal movement of the shaft body 320.

The first shape memory wire 362 is secured at one end thereof to the support plate 302 and attached at an opposing end thereof to the first side 322a of the first end 322 of the shaft body 320. The second shape memory wire 364 is secured at one end thereof to the support plate 302 and attached at an opposing end thereof to the second side 322b of the first end of the shaft body. As shown most clearly in FIG. 1A, each shape wire is preferably looped around a finger formed on a side of the first end 322 of the shaft body 320. For example, the first shape wire 362 is wrapped around a finger 323 of the first side 322a for a secure attachment thereto. The term "attachment" as used herein with respect to shape memory wires shall thus refer broadly to stationary attachment and looped attachment, as well as any other suitable attachment.

Current means 330 for alternately passing electrical current through the first and second shape memory wires 362 and 364 is electrically connected to said shape memory wires. The current means 330 is electrically connected to a source of electricity 180. The current means 330 is operable in any manner known in the art to alternately cause the first shape memory wire 362 and the second shape memory wire 364 to contract in alternating tandem. Contraction of the first shape memory wire 362 causes the shaft body 320 to pivot about its pivot point 326 in one pivotal direction A shown by arrow 340, and contraction of the second shape memory wire 364 causes the shaft body to pivot about the pivot point in a second pivotal direction B, such that (i) contraction of the first shape memory wire 362 and the resulting pivotal movement of the shaft body 320 causes the first rod member 324a to move between the support plate 302 and the first lever 308 to thereby force the second portion 308b of said first lever in a direction away from the first valve pin 304 to thereby release pressure exerted by the first lever 308 upon its valve pin 304, and (ii) contraction of the second shape memory wire 364 and the resulting pivotal movement of the shaft body 320 causes the second rod member 324b to move between the support plate 302 and the second lever 310 to thereby force the second portion 310b of said second lever in a direction away from the second valve pin 306 to thereby release pressure exerted by the second lever 310 upon its valve pin 306.

It will be appreciated by inspection of FIG. 2 that the alternating contraction and release of the first and second shape memory wires 362 and 364 operate to move the valve pins 304 and 306 toward and away from flow channel structure such as the resilient membrane 139.

It can thus be seen in the illustration of FIG. 1 that the second shape memory wire 364 has been electrically heated to contract. The shaft body 320 has been pivoted in direction B of arrow 340 to force a thicker portion 336b of the second rod member 324b contactably between the support plate 302 and the second portion 310b of the second lever 310 to thereby lift said second portion upward and release the second valve pin 306. At the same time, the first rod member 324a has been moved so that the second portion 308b of the first lever 308 resides above a narrower part 334a of said first rod member, thereby allowing the first lever 308 to force the first valve pin 304 into the support plate 302.

The levers 308 and 310 are thus naturally biased to force the valve pins 304 and 306 into the support plate 302, and operate to pull the pins out of the support plate when a thicker part of the rod members 324a and 324b move between the levers and the support plate. The valve pins can be provided with their own spring-action resistance which biases them partially out of the support plate 302 in the absence of counteracting resistance from the levers. Alternatively, the valve pins can be secured directly to their corresponding levers to move in tandem therewith.

It is preferred to provide the shaft body 320 with the narrower portions 334a–b and the thicker portions 336a–b as shown most clearly in FIG. 1B. Bumps 332a–b are provided to prevent vibrations, jarring and other forces from inadvertently pivoting the rod 320 into an undesired switched position. However, it is to be understood that the shaft body 320 can embody numerous varying designs and dimensions of thicker/narrow configurations in order to accomplish the alternating forcing and releasing of the levers 308 and 310. Undesired pivot action of the shaft body 320 can be inhibited further if the pivot point 326 is made to substantially coincide with the center of mass of the shaft body 320. This operates to balance the shaft body 320 about its pivot point 326 to avoid assisting vibrational or jarring forces in causing undesired pivot action.

The switching device 300 can be used in many applications. For example, the valve pins 304 and 306 can function as part of pinch valve structure as illustrated schematically in FIG. 2. The pins 304 and 306 rest against a resilient membrane 139 and operate to force the membrane to deform into fluid channels 123 and 134 to block fluid flow therein. When a pin 304 or 306 is moved in a direction away from the membrane 139, elastic memory operates to contract the membrane 39 back into a natural position and release fluid flow within the fluid channel.

Referring still to FIG. 2, those skilled in the art will appreciate numerous alternative arrangements for retractably forcing the valve pins 304 and 306 into the membrane 139. For example, the valve pins 304 and 306 can be biased into a natural resting position against the membrane 139 without forcing the membrane into the fluid channel as illustrated by valve pin 304. A pin's associated lever forces the pin into the membrane to cause the membrane to block fluid flow within its adjacent flow channel, as illustrated by valve pin 306 and lever 310. The switching device 300 operates to alternately force and release the valve pins into the membrane to thereby cause the valve pins 304 and 306 to alternately block and release fluid flow within the flow channels 134 and 123, respectively.

It will be appreciated that the switching device 300 has numerous uses and advantages, and the invention is thus not limited to applications involving pinch valves. The reciprocating pivotal movement of the shaft body 320 has independent utility, and can be applied to mobilize a pair of switching means in alternating tandem between first and second switched positions. The device 300 can be designed such that a second valve means (for example valve pin 306 as associated with the membrane 139) is not opened until after a first valve means (for example valve pin 304 as associated with the membrane 139) has been closed, and vice versa, such that there is no position whereby both valve means are open at the same time.

It may be desirable to vary the switching rate of the switching device 300. Electronic control means 182 could be electrically connected to the electricity source 180, to control the flow of electricity therefrom, for example by intermittently stopping and releasing electron flow from the electricity source 180.

Those skilled in the art will appreciate that the scope of the present invention encompasses many combinations and a broad spectrum of features and structures equivalent to those specifically discussed herein. The principles of the invention can be used in any setting enhanced by the reciprocating pivotal movement of the shaft body 320. Those having ordinary skill in the field of this invention will appreciate the advantages of the invention and its application to a wide variety of uses. The present invention represents a significant advance in the field of fluid delivery. Those skilled in the art will appreciate from the preceding disclosure that the objectives stated above are advantageously achieved by the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A switching device for alternately moving an object between first and second positions, said switching device comprising:

support means;

rigid shaft means having a pivot point and first and second opposing end portions, said shaft means being pivotally mounted to the support means at the pivot point, said first opposing end portion having first and second opposing sides;

first shape memory means secured at one end thereof to the support means and attached at an opposing end thereof to the first side of the first end portion of the shaft means;

second shape memory means secured at one end thereof to the support means and attached at an opposing end thereof to the second side of the first end portion of the shaft means;

means for alternately passing electrical current through the first and second shape memory means to thereby cause the first shape memory means and the second shape memory means to contract in alternating tandem, wherein contraction of the first shape memory means causes the shaft means to pivot about its pivot point to move the second end of said shaft means into a first position and wherein contraction of the second shape memory means causes the shaft means to pivot about its pivot point to move the second end of said shaft means away from the first position and into a second position;

wherein the second end of the shaft means includes first and second portions, said switching device further comprising first and second switching means disposed on the support means such that the contraction of the first and second shape memory means in alternating tandem causes the first and second portions of the second end of the shaft means to respectively move into and out of contact with the first and second switching means to thereby mobilize each switching means between first and second switched positions;

wherein the first and second switching means respectively comprise first and second lever means being respectively biased against first and second valve pins so as to exert pressure upon said valve pins tending to force said pins into first switched positions, wherein movement of the second end of the shaft means into contact with one of the switching means causes said second end of the shaft to force the lever means of said switching means in a direction away from its corresponding valve pin into a second switched position to thereby release pressure exerted by the lever means upon the valve pin.

2. A switching device as defined in claim 1, wherein the shaft means includes a shaft body and wherein the first and second portions of the second end of the shaft means comprise first and second rod members extending laterally outward in opposing directions from the shaft body, such that (i) contraction of the first shape memory means and the resulting pivotal movement of the shaft means causes the first rod member to move between the support means and the first lever means to thereby move the first lever means away from the support means so as to release the first valve pin from pressure exerted thereon by said first lever means, and (ii) contraction of the second shape memory means and the resulting pivotal movement of the shaft means causes the second rod member to move between the support means and the second lever means to thereby move the said second lever means away from the support means so as to release the second valve pin from pressure exerted thereon by said second lever means.

3. A switching device as defined in claim 1, wherein each valve pin comprises a pinch pin of a pinch valve and wherein each lever means is naturally biased to tend to force its corresponding pinch pin into its first switched position and against flow channel apparatus so as to block fluid flow within a flow channel, such that movement of each said lever means away from its corresponding pinch pin into the second switched position enables movement of said pinch pin away from the flow channel apparatus to thereby release fluid flow within the flow channel.

4. A switching device as defined in claim 2, wherein each valve pin comprises a pinch pin of a pinch valve wherein each lever means is naturally biased to tend to force its corresponding pinch pin into its first switched position and against flow channel apparatus so as to block fluid flow within a flow channel, such that movement of each said lever means away from its corresponding pinch pin into the second switched position enables movement of said pinch pin away from the flow channel apparatus to thereby release fluid flow within the flow channel.

5. A switching device for alternately moving an object between first and second positions, said switching device comprising:

support means;

rigid shaft means having a pivot point and first and second opposing end portions, said shaft means being pivotally mounted to the support means at the pivot point, said first opposing end portion having first and second opposing sides;

first shape memory means secured at one end thereof to the support means and attached at an opposing end thereof to the first side of the first end portion of the shaft means;

second shape memory means secured at one end thereof to the support means and attached at an opposing end thereof to the second side of the first end portion of the shaft means;

means for alternately passing electrical current through the first and second shape memory means to thereby cause the first shape memory means and the second shape memory means to contract in alternating tandem, wherein contraction of the first shape memory means causes the shaft means to pivot about its pivot point to move the second end of said shaft means into a first position and wherein contraction of the second shape memory means causes the shaft means to pivot about its pivot point to move the second end of said shaft means away from the first position and into a second position;

wherein the second end of the shaft means includes first and second opposing sides, each said opposing side including thicker and narrower portions, said switching device further comprising first and second switching means disposed on the support means such that contraction of the first and second shape memory means in alternating tandem causes the thicker portions of the first and second opposing sides of the second end of the shaft means to respectively move into and out of contact with the first and second switching means to thereby mobilize each switching means between first and second switched positions.

6. A switching device as defined in claim 5 wherein the first and second switching means respectively comprise first and second lever means, each lever means being anchored at one end to the support means and being naturally biased at an opposing end against switching apparatus, such that contraction of the first and second shape memory means in alternating tandem causes the thicker portions of the first and second opposing sides of the second end of the shaft means to respectively move (i) contactably between the support means and the first and second lever means, respectively, and (ii) out from between the support means and the first and second lever means, respectively, to thereby lift and release the first and second lever means in alternating tandem.

7. A switching device as defined in claim 6, wherein the first and second switching means further comprise first and second valve pins, respectively, the first and second lever means being respectively biased against said first and second valve pins so as to exert pressure upon said valve pins tending to force said pins into first switched positions, wherein (i) movement of a thicker portion of a side of the second end of the shaft means contactably between the support means and one of the lever means operates to force said lever means in a direction away from its corresponding valve pin into a second switched position to thereby release pressure exerted by the lever means upon the valve pin, and (ii) movement of said thicker portion out from between the support means and the lever means operates to release said lever means back into its natural biased position against its corresponding valve pin to resume exertion of pressure thereupon.

8. A switching device as defined in claim 7, wherein each valve pin comprises a pinch pin of a pinch valve and wherein each lever means is naturally biased to tend to force its corresponding pinch pin into its first switched position and against flow channel apparatus so as to block fluid flow within a flow channel, such that movement of each said lever means away from its corresponding pinch pin into the second switched position enables movement of said pinch pin away from the flow channel apparatus to thereby release fluid flow within the flow channel.

9. A switching device as defined in claim 5, further comprising means for inhibiting undesired pivotal movement of the shaft means caused by vibration or jarring or the like.

10. A switching device as defined in claim 9, wherein the means for inhibiting undesired pivotal movement comprises first and second bumps which separate the thicker and narrower portion of the first and second opposing sides of the second end of the shaft means, respectively, said first and second bumps extending outward from the shaft means in a direction toward the first and second switching means, respectively, and further in said direction than the thicker portions of the first and second opposing sides of the second end of the shaft means, respectively, said first and second bumps being respectively engageable with the first and second switching means so as to produce resistance to pivotal movement of the shaft means.

11. A switching device for alternately moving an object between first and second positions, said switching device comprising:
   support means;
   rigid shaft means having a pivot point and first and second opposing end portions, said shaft means being pivotally mounted to the support means at the pivot point, said first opposing end portion having first and second opposing sides;
   first shape memory means secured at one end thereof to the support means and attached at an opposing end thereof to the first side of the first end portion of the shaft means;
   second shape memory means secured at one end thereof to the support means and attached at an opposing end thereof to the second side of the first end portion of the shaft means;
   means for alternately passing electrical current through the first and second shape memory means to thereby cause the first shape memory means and the second shape memory means to contract in alternating tandem, wherein contraction of the first shape memory means causes the shaft means to pivot about its pivot point to move the second end of said shaft means into a first position and wherein contraction of the second shape memory means causes the shaft means to pivot about its pivot point to move the second end of said shaft means away from the first position and into a second position;
   wherein at least one of the first and second opposing sides of the first opposing end portion of the shaft means includes a finger member formed thereon, and wherein the attachment of shape memory means to said at least one of the first and second opposing sides comprises said shape memory means being looped around said finger member.

12. A switching device for alternately moving an object between first and second positions, said switching device comprising:
   support means;
   rigid shaft means having a pivot point and first and second opposing end portions, said shaft means being pivotally mounted to the support means at the pivot point, said first opposing end portion having first and second opposing sides;
   first shape memory means secured at one end thereof to the support means and attached at an opposing end thereof to the first side of the first end portion of the shaft means;
   second shape memory means secured at one end thereof to the support means and attached at an opposing end thereof to the second side of the first end portion of the shaft means;
   means for alternately passing electrical current through the first and second shape memory means to thereby cause the first shape memory means and the second shape memory means to contract in alternating tandem, wherein contraction of the first shape memory means causes the shaft means to pivot about its pivot point to move the second end of said shaft means into a first position and wherein contraction of the second shape memory means causes the shaft means to pivot about its pivot point to move the second end of said shaft means away from the first position and into a second position;
   wherein the pivot point of the shaft means substantially coincides with a center of mass of said shaft means to thereby inhibit undesired pivotal movement of the shaft means caused by vibration or jarring or the like.

* * * * *